UNITED STATES PATENT OFFICE.

HEINRICH BUSSE, OF LINDEN, VOR HANOVER, PRUSSIA, GERMANY.

PROCESS OF MAKING ARTIFICIAL OR ELASTIC BITUMEN FOR PAVING.

SPECIFICATION forming part of Letters Patent No. 376,289, dated January 10, 1888.

Application filed July 13, 1886. Serial No. 207,934. (No specimens.)

*To all whom it may concern:*

Be it known that I, HEINRICH BUSSE, chemist, a subject of the Emperor of Germany, residing in Linden, vor Hanover, Prussia, Germany, have invented a new method of fabrication of artificial elaterite or elastic bitumen and its use as raw material for rammed, stamped, or pressed asphaltum for paving, &c., purposes; and I do hereby declare that the following is a full, clear, and exact description of the same.

The subject of the following invention consists in the production of elaterite from liquid bitumens or naphtha, being very resistant against chemical influences, as well known. According to my invention this naphtha is mixed with ten per cent. to thirty per cent. of vegetable oils or fatty or sebacic acids. The vegetable oils used for that purpose are: castor oil, (*Ricinus communis,*) cotton-seed oil, (*Gossypium,*) palm-oil, poppy-seed oil, linseed-oil, hemp-seed oil, rape-seed oil, and nut-oil, (*Juglans regia.*) By that operation the resisting qualities of the naphtha are overcome. The obtained product is treated with chemical products, to wit: nitric acid, nitrous acid, sulphur, chloruret of sulphur, and compressed atmospheric air or other substances accelerating oxidation under the influence and with the aid of heat and with or without pressure, and immediately the reduction into elaterite begins.

The quantities of the chemical products may be accommodated to the quality of the naphtha in use, and in consequence of it they vary in sulphur from fifteen per cent. to thirty per cent., and in nitric acid from ten per cent. to fifteen per cent. For this purpose I deliver first the liquid bitumens or naphtha from the volatile oils by heating them to about 250° Celsius, because otherwise they would prejudice the proceeding of the reduction.

The substances for the production of elaterite are heated to 180° Celsius in caldrons of sufficient size, made of iron or clay, by direct fire or by steam-heating. It is advantageous to maintain the temperature by stirring the mass constantly; but the said point of heat should not be overreached, because the quality of the product would become inferior. The thus obtained elaterite has the form of an elastic resin—sort of caoutchouc—which corresponds entirely with the elaterite of natural production. From the ozokerite this artificial elaterite distinguishes by the aggregate, the first being a ceruminous aromatic substance, without any elastic quality, on the contrary, artificial elaterite being a quite caoutchouc-like elastic material. Elaterite may also be vulcanized in the same manner as caoutchouc, and remains unchanged in temperatures from $-20°$ Celsius to $+120°$ Celsius, also it cannot be transformed to paraffine.

Ozokerite may be changed, at a temperature from 60° to 84° Celsius, to a clear oily fluid.

Having now particularly described and ascertained the nature of my said invention, I declare that what I claim is—

The process of manufacturing artificial elaterite from naphtha or liquid bitumens, consisting in subjecting the materials to a proper degree of heat, cooling and mixing them with vegetable oils, fatty or sebacic acids, treating the mixture with nitrous acid and compressed atmospheric air, and subjecting the entire mixture to a proper degree of heat, substantially as set forth.

In testimony whereof I hereunto sign my name, in the presence of two subscribing witnesses, this 24th day of June, 1886.

HEINRICH BUSSE.

Witnesses:
 HERMANN REYFRY,
 GABRIEL V. HIRSCH.